US009528560B2

(12) United States Patent
Yamagami et al.

(10) Patent No.: US 9,528,560 B2
(45) Date of Patent: Dec. 27, 2016

(54) CLUTCH

(71) Applicants: DENSO CORPORATION, Kariya, Aichi-pref. (JP); MEIJO UNIVERSITY, Nagoya-shi, Aichi (JP)

(72) Inventors: Yousuke Yamagami, Obu (JP); Yasuo Tabuchi, Toyoake (JP); Motohiko Ueda, Okazaki (JP); Shouzou Tatematsu, Nagoya (JP); Youichi Murakami, Ama (JP); Shigeyoshi Sakuraba, Torino (JP); Hatsuhiko Usami, Nagoya (JP)

(73) Assignees: DENSO CORPORATION, Kariya (JP); MEIJO UNIVERSITY, Nagoya-shi (JP)

( * ) Notice: Subject to any disclaimer, the term of this patent is extended or adjusted under 35 U.S.C. 154(b) by 206 days.

(21) Appl. No.: 14/518,146

(22) Filed: Oct. 20, 2014

(65) Prior Publication Data

US 2015/0292573 A1 Oct. 15, 2015

(30) Foreign Application Priority Data

Apr. 15, 2014 (JP) .................................. 2014-83539

(51) Int. Cl.
*F16D 27/112* (2006.01)
*F16D 27/14* (2006.01)
*F16D 27/00* (2006.01)

(52) U.S. Cl.
CPC ............. *F16D 27/14* (2013.01); *F16D 27/112* (2013.01); *F16D 2027/008* (2013.01)

(58) Field of Classification Search
CPC ... F16D 2027/008; F16D 27/112; F16D 27/14
USPC ............................ 192/84.941, 84.961, 107 R
See application file for complete search history.

(56) References Cited

U.S. PATENT DOCUMENTS

| 3,082,933 | A | * | 3/1963 | Bernard | ................ F16D 27/112 |
| | | | | | 192/107 R |
| 4,432,446 | A | * | 2/1984 | Okano | .................. F16D 27/112 |
| | | | | | 192/84.941 |
| 4,951,797 | A | * | 8/1990 | Booth | ..................... F16D 27/14 |
| | | | | | 192/107 R |
| 5,232,076 | A | * | 8/1993 | Nakagawa | ............ F16D 27/112 |
| | | | | | 192/84.961 |
| 2012/0156062 | A1 | | 6/2012 | Hamasaki et al. | |

FOREIGN PATENT DOCUMENTS

JP    4-165125 A  *  6/1992

OTHER PUBLICATIONS

Satoshi Okajima and Hatsuhiko Usami. "Effects of ferro oxide dispersion on friction properties of steel surface in dry condition." Meijo University. Materials Science and Engineering Department, M&P2012, No. 12-9, 2012. (English abstract attached and discussed on p. 1 of the specification).

(Continued)

*Primary Examiner* — Richard Lorence
(74) *Attorney, Agent, or Firm* — Posz Law Group, PLC

(57) ABSTRACT

A recess, which has a bottom, is formed in at least one of a contact surface of a rotor and a contact surface of an armature. A solid material, which is made of thermoset resin that contains powder of metal oxide or metal dispersed in the thermoset resin, is formed in an inside of the recess.

8 Claims, 6 Drawing Sheets

(56) References Cited

OTHER PUBLICATIONS

Satoshi Okajima and Hatsuhiko Usami. "Effects of ferro oxide dispersion on friction properties of Carbon Steel Surface in Dry Condition." Meijo University. Tribe conference 2013 Autumn, Fukuoka, Oct. 24, 2013. (partial English translation attached).

* cited by examiner

CLUTCH

CROSS REFERENCE TO RELATED APPLICATION

This application is based on and incorporates herein by reference Japanese Patent Application No. 2014-83539 filed on Apr. 15, 2014.

TECHNICAL FIELD

The present disclosure relates to a clutch.

BACKGROUND

The non-patent document 1, which is recited below, discloses a result of evaluation of dry friction characteristics evaluated at the time of contacting, i.e., coupling a disk test piece, which is made of a ferroalloy, and a ring test piece together. In the disk test piece used in this evaluation, iron oxide powder is embedded in an inside of a recess formed in a contact surface of the disk test piece. According to this result of the evaluation, when coupling and decoupling between the disk test piece and the ring test piece are executed while rotating the disk test piece, a friction coefficient between the disk test piece and the ring test piece becomes high and is stabilized.

NON-PATENT DOCUMENT 1

EFFECTS OF FERRO OXIDE DISPERSION ON FRICTION PROPERTIES OF STEEL SURFACE IN DRY CONDITION, Satoshi OKAJIMA and Hatsuhiko USAMI, "Special Issue on the 20th Materials and processing conference (M&P2012)", CD-ROM Proceedings, The Japan Society of Mechanical Engineers, Year 2012, No. 12-9

In order to improve a transmission torque of a clutch, which is constructed to magnetically attract an armature to a rotor with a magnetic force, an attracting force for attracting the armature to the rotor, an effective diameter of contact surfaces of the armature and the rotor, and/or a friction coefficient of the contact surfaces of the armature and the rotor may be improved.

It is conceivable to apply the technique of the non-patent document 1 to the clutch, which is constructed to magnetically attract the armature to the rotor with the magnetic force, in such a manner that a recess is formed in at least one of the contact surface of the armature and the contact surface of the rotor, and iron oxide powder is embedded in an inside of the recess. In this way, the friction coefficient at the contact surfaces of the armature and the rotor can be improved to improve the transmission torque of the clutch.

However, according to the technique of the non-patent document 1, the iron oxide powder is solely placed in the recess. Therefore, in a case where the clutch (e.g., a clutch used in a drive mechanism of a compressor of a vehicle air conditioning system) is rotated at a higher rotational speed in comparison to a rotational speed of the disk test piece and the ring test piece of the non-patent document 1, the iron oxide powder cannot be held in the inside of the recess, and it is difficult to maintain the state of the high friction coefficient (hereinafter referred to as a high friction coefficient state). The above disadvantage is not limited to the case where the iron oxide powder is used, and the above disadvantage may occur in a case where another type of metal oxide or metal powder is used.

SUMMARY

The present disclosure addresses the above disadvantage.

According to the present disclosure, there is provided a clutch, which includes a rotor and an armature. The rotor is made of a magnetic material. The rotor is rotated when the rotor receives a rotational drive force from a drive source. The armature is made of a magnetic material. The armature receives the rotational drive force from the rotor when the armature is magnetically attracted to and is coupled with the rotor by a magnetic force. The rotor and the armature include contact surfaces, respectively, which contact with each other when the armature is magnetically attracted to and is coupled with the rotor. A recess, which has a bottom, is formed in at least one of the contact surface of the rotor and the contact surface of the armature, and a solid material, which is made of thermoset resin that contains powder of metal oxide or metal dispersed in the thermoset resin, is formed in an inside of the recess.

BRIEF DESCRIPTION OF THE DRAWINGS

The drawings described herein are for illustration purposes only and are not intended to limit the scope of the present disclosure in any way.

DETAILED DESCRIPTION

Figure 1:
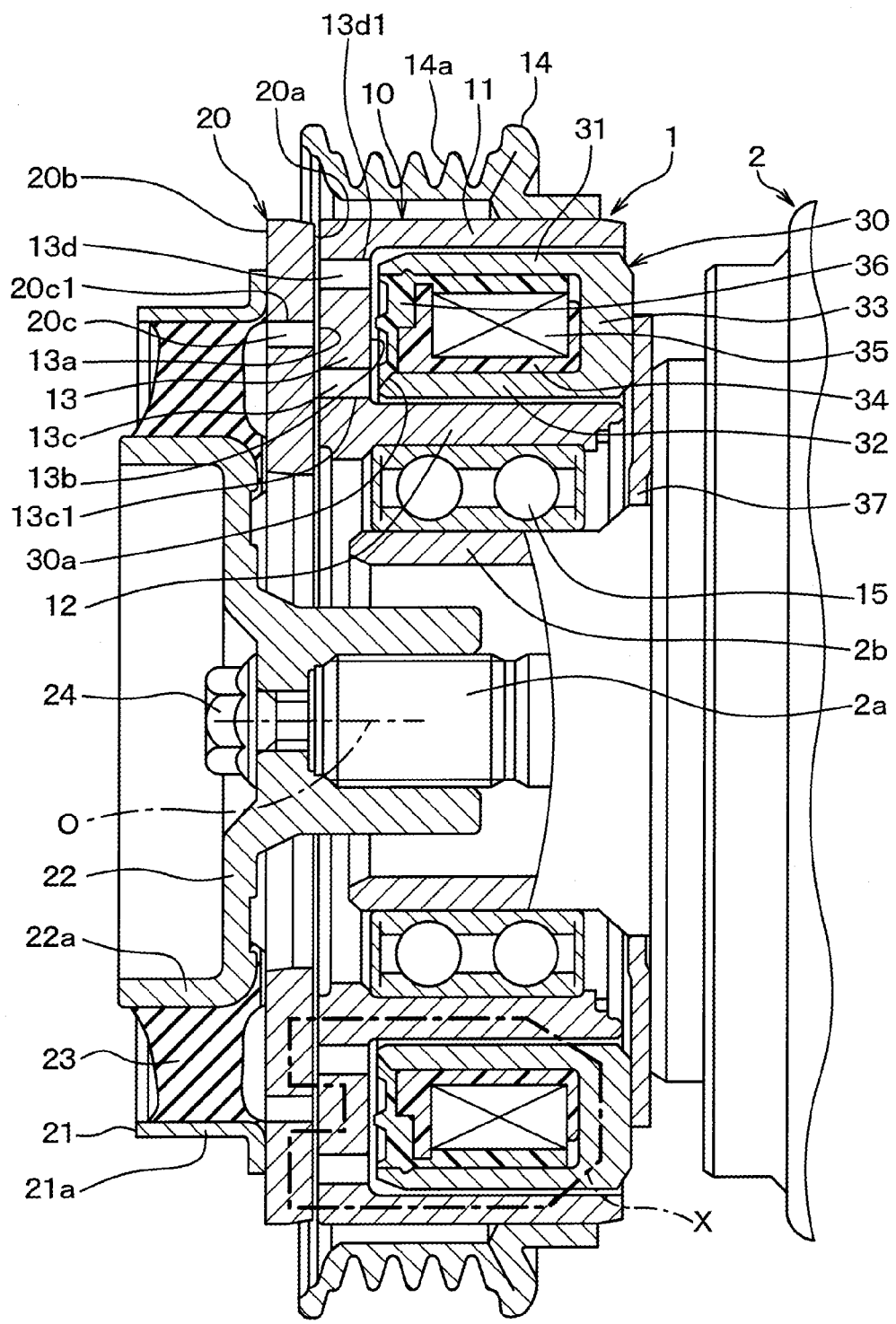
FIG. 1 is a cross-sectional view of a solenoid clutch according to a first embodiment of the present disclosure.

Various embodiments of the present disclosure will be described with reference to the accompanying drawings. In each of the following embodiments, the same or similar components are indicated by the same reference numerals.

First Embodiment

A solenoid clutch 1 of a first embodiment shown in FIG. 1 is used in a drive mechanism of a compressor 2. The drive mechanism of the compressor 2 rotates a compression mechanism when the drive mechanism receives a rotational drive force from an internal combustion engine, which serves as a drive source that outputs a drive force for driving a vehicle. Therefore, in the present embodiment, the engine is the drive source, and the compressor 2 is a driven-side apparatus.

The compressor 2 suctions and compresses refrigerant. The compressor 2 cooperates with a radiator, an expansion valve and an evaporator to form a refrigeration cycle of a vehicle air conditioning system. The radiator radiates heat from the refrigerant, which is discharged from the compressor 2. The expansion valve depressurizes and expands the refrigerant, which is outputted from the radiator. The evaporator evaporates the refrigerant, which is depressurized by the expansion valve, to implement heat absorption.

The solenoid clutch 1 includes a rotor 10 and an armature 20. The rotor 10 forms a driving-side rotatable body, which is rotated about a rotational central axis O thereof when the rotor 10 receives the rotational drive force from the engine. The armature 20 forms a driven-side rotatable body, which is connected to a rotatable shaft 2a of the compressor 2. When the rotor 10 and the armature 20 are coupled with each other, conduction of the rotational drive force from the engine to the compressor 2 is enabled. In contrast, when the rotor 10 and the armature 20 are decoupled from each other, the conduction of the rotational drive force from the engine to the compressor 2 is disabled. FIG. 1 shows a state where the rotor 10 and the armature 20 are decoupled from each other.

When the solenoid clutch 1 couples between the rotor 10 and the armature 20, the rotational drive force of the engine is conducted to the compressor 2 to drive the refrigeration cycle. In contrast, when the solenoid clutch 1 decouples between the rotor 10 and the armature 20, the rotational drive force of the engine is not conducted to the compressor 2. Thereby, the refrigeration cycle is not driven. The operation of the solenoid clutch 1 is controlled by a control signal, which is outputted from an air conditioning control device that controls the operation of each of the constituent devices of the refrigeration cycle.

Now, a specific structure of the solenoid clutch 1 will be described. As shown in FIG. 1, the solenoid clutch 1 includes the rotor 10, the armature 20 and a stator 30.

The rotor 10 is configured into a double cylindrical tubular body, which has an opening on an axial side that is spaced away from and is opposite from the armature 20, and a cross section of the double cylindrical tubular body of the rotor 10 is configured to have a U-shape. Specifically, the rotor 10 includes an outer cylindrical tubular portion 11, an inner cylindrical tubular portion 12 and an end surface portion 13. The inner cylindrical tubular portion 12 is placed on a radially inner side of the outer cylindrical tubular portion 11. The end surface portion 13 extends in a direction that is perpendicular to the rotational central axis O in such a manner that the end surface portion 13 connects between an end part of the outer cylindrical tubular portion 11 and an end part of the inner cylindrical tubular portion 12, which are located on an axial side where the armature 20 is located. The outer cylindrical tubular portion 11, the inner cylindrical tubular portion 12 and the end surface portion 13 are made of a magnetic material (e.g., iron material).

The outer cylindrical tubular portion 11 and the inner cylindrical tubular portion 12 are arranged coaxially with the rotatable shaft 2a of the compressor 2. Specifically, the rotational central axis O of FIG. 1 serves as a rotational central axis of the outer cylindrical tubular portion 11, a rotational central axis of the inner cylindrical tubular portion 12 and a rotational central axis of the rotatable shaft 2a. A pulley 14 is connected to an outer peripheral part of the outer cylindrical tubular portion 11. V-shaped grooves (poly-V-groove) 14a, around which a V-belt is wound, are formed in the pulley 14. An outer race of a ball bearing 15 is fixed to an inner peripheral part of the inner cylindrical tubular portion 12.

The ball bearing 15 rotatably supports the rotor 10 relative to a housing that forms an outer shell of the compressor 2. Therefore, an inner race of the ball bearing 15 is fixed to a housing boss 2b, which is formed in the housing of the compressor 2.

The end surface portion 13 is a wall portion that is axially opposed to the armature 20. The end surface portion 13 includes one surface, which will be hereinafter referred to as a friction surface 13a and is located on the axial side where the armature 20 is placed. The end surface portion 13 further includes an opposite surface (the other surface) 13b, which is located on the opposite axial side that is axially opposite from the armature 20. In other words, the end surface portion 13 includes the friction surface (the one surface) 13a and the opposite surface (the other surface) 13b, which are located on the one axial side and the opposite axial side in the axial direction of the rotational central axis O. Furthermore, the friction surface (the one surface) 13a and the opposite surface (the other surface) 13b extend in the direction that is perpendicular to the axial direction. The friction surface (the one surface) 13a of the end surface portion 13 is opposed to the armature 20 and is also referred to as a contact surface of the rotor 10, which contacts the armature 20 when the armature 20 is coupled with the rotor 10. The friction surface (the one surface) 13a generates friction when the friction surface 13a contacts the armature 20.

A plurality of magnetically insulating slits 13c, 13d, which interrupt a flow of a magnetic flux, is formed in the friction surface 13a of the end surface portion 13. In the present embodiment, the magnetically insulating slits 13c, 13d, each of which is configured into an arcuate form, are arranged one after another in a radial direction. The magnetically insulating slits 13c, 13d are formed by magnetically insulating slit forming parts 13c1, 13d1. The magnetically insulating slits 13c, 13d axially extend through the end surface portion 13 in the axial direction from the friction surface 13a to the opposite surface 13b.

The armature 20 is made of a magnetic material (e.g., iron material). The armature 20 is a circular disk member, which radially extends in the direction perpendicular to the rotational central axis O and has a through-hole that extends in the axial direction of the rotational central axis O through a center part of the circular disk member. A rotational center of the armature 20 is coaxial with the rotatable shaft 2a of the compressor 2. Specifically, the rotational central axis of the armature 20 coincides with the rotational central axis O.

The armature 20 includes one surface, which will be hereinafter referred to as a friction surface 20a and is located on an axial side where the rotor 10 is placed. The armature 20 further includes an opposite surface (the other surface) 20b, which is located on an opposite axial side that is opposite from the rotor 10. In other words, the armature 20 includes the friction surface (the one surface) 20a and the opposite surface (the other surface) 20b, which are located on the one axial side and the opposite axial side in the axial direction of the rotational central axis O. Furthermore, the friction surface (the one surface) 20a and the opposite surface (the other surface) 20b extend in the direction that is perpendicular to the axial direction. The friction surface (the one surface) 20a of the armature 20 is opposed to the rotor 10 and is also referred to as a contact surface of the armature 20, which contacts the rotor 10 when the armature 20 is coupled with the rotor 10. The friction surface 20a generates friction when the friction surface 20a contacts the rotor 10.

Similar to the end surface portion 13 of the rotor 10, a plurality of magnetically insulating slits 20c is formed in the friction surface 20a of the armature 20. In the present embodiment, the magnetically insulating slits 20c are arcuately elongated. The magnetically insulating slits 20c are formed by magnetically insulating slit forming parts 20c1. The magnetically insulating slits 20c extend through the armature 20 in the axial direction from the friction surface 20a to the opposite surface 20b. The magnetically insulating slits 20c are radially placed between the magnetically insulating slits 13c, which are located on the radially inner side in the end surface portion 13, and the magnetically insulating slits 13d, which are located on the radially outer side in the end surface portion 13.

An outer hub 21, which is configured into a circular disk form, is fixed to the opposite surface 20b of the armature 20. The outer hub 21 and an inner hub 22 described later form a connecting member, which connects between the armature 20 and the rotatable shaft 2a of the compressor 2. Each of the outer hub 21 and the inner hub 22 includes a cylindrical tubular portion 21a, 22a, which extends in the axial direction of the rotational central axis O. A cylindrical tubular rubber 23 is vulcanized and is secured to an inner peripheral surface of the cylindrical tubular portion 21a of the outer hub 21 and the cylindrical tubular portion 22a of the inner hub 22. The rubber 23 is a resilient member that is made of a resilient material (elastomer, i.e., an elastic material).

Furthermore, the inner hub 22 is fixed to a threaded screw hole of the rotatable shaft 2a of the compressor 2 by a bolt 24, which is threadably fitted into the threaded screw hole of the rotatable shaft 2a. That is, the inner hub 22 is coupleable relative the rotatable shaft 2a of the compressor 2.

In this way, the armature 20, the outer hub 21, the rubber 23, the inner hub 22 and the rotatable shaft 2a of the compressor 2 are joined one after another. When the rotor 10 and the armature 20 are coupled with each other, the armature 20, the outer hub 21, the rubber 23, the inner hub 22 and the rotatable shaft 2a of the compressor 2 are rotated together with the rotor 10.

Furthermore, the rubber 23 exerts a resilient force relative to the outer hub 21 in a direction away from the rotor 10. In the decoupled state where the rotor 10 and the armature 20 are decoupled from each other, a predetermined gap is formed between the friction surface 13a of the rotor 10 and the friction surface 20a of the armature 20 that is joined to the outer hub 21.

The stator 30 is placed in an inner space of the rotor 10, which is defined by the outer cylindrical tubular portion 11, the inner cylindrical tubular portion 12 and the end surface portion 13 of the rotor 10. Thereby, the stator 30 is axially opposed to the opposite surface 13b of the end surface portion 13. The stator 30 is made of a magnetic material (e.g., an iron material) and receives a solenoid coil 35 in an inside of the stator 30.

The stator 30 is configured into a double cylindrical tubular body, which has an opening 30a on an axial side where the end surface portion 13 is located, and a cross section of the double cylindrical tubular body is configured to have a U-shape. Specifically, the stator 30 includes an outer cylindrical tubular portion 31, an inner cylindrical tubular portion 32 and an end surface portion 33. The inner cylindrical tubular portion 32 is placed on a radially inner side of the outer cylindrical tubular portion 31. The end surface portion 33 extends in the direction that is perpendicular to the rotational central axis O in such a manner that the end surface portion 33 connects between an end part of the outer cylindrical tubular portion 31 and an end part of the inner cylindrical tubular portion 32, which are located on the axial side that is axially spaced away from and is opposite from the friction surface 13a of the rotor 10.

A coil spool 34, which is configured into an annular form, is received in the inner space of the stator 30. The coil spool 34 is made of a resin material (e.g., polyamide resin). The solenoid coil 35 is wound around the coil spool 34.

Furthermore, a resin member 36, which is made of a resin material (e.g., polyamide resin), is provided at the opening 30a of the stator 30. In this way, the opening 30a of the stator 30 is closed by the resin member 36.

Furthermore, a stator plate 37 is fixed to the outer side (the right side in FIG. 1) of the end surface portion 33 of the stator 30. The stator 30 is fixed to the housing of the compressor 2 through the stator plate 37.

Next, the friction surface 13a of the rotor 10 and the friction surface 20a of the armature 20 will be described.

Figure 2:
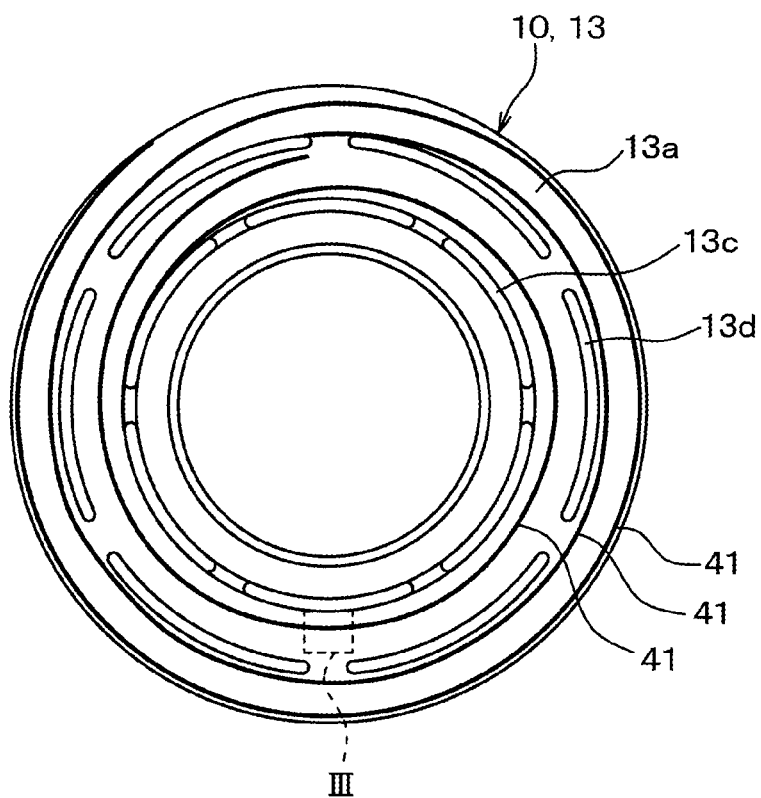
FIG. 2 is a front view of a friction surface of a rotor shown in FIG. 1.

As shown in FIG. 2, the friction surface 13a of the rotor 10 has spiral grooves 41, each of which is configured into a spiral form. Here, the spiral form means elongation in a line form (a curved line form, i.e., a curved line shape) in the circumferential direction (spiral direction) in a pattern, which is similar to continuous circles that are centered on a center of the friction surface 13a. Therefore, the friction surface 13a has the grooves 41, which extend in the line form in the circumferential direction and are arranged one after another in the radial direction. The grooves 41 are formed in a corresponding area of the friction surface 13a of the rotor 10, which does not have the magnetically insulating slits 13c, 13d and a friction member 16. That is, the grooves 41 are formed in the corresponding area of the friction surface 13a of the rotor 10, which forms a magnetic circuit X of FIG. 1 discussed later.

Figure 3:
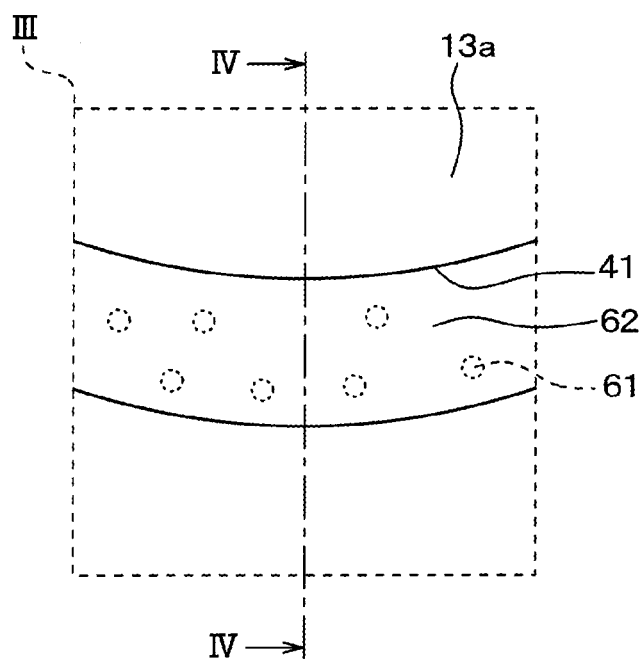
FIG. 3 is an enlarged view of an area III in FIG. 2.
Figure 4:
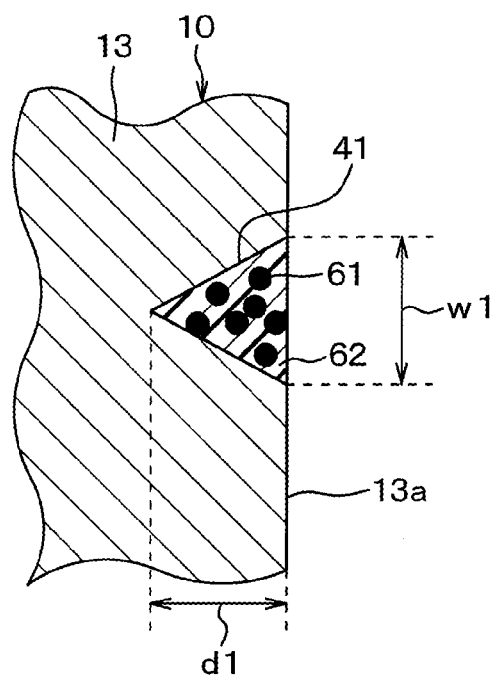
FIG. 4 is a partial cross-sectional view taken along line IV-IV in FIG. 3.

As shown in FIGS. 3 and 4, each groove 41 is a recess that has a bottom, and thereby the groove 41 does not extend through the end surface portion 13. The grooves 41 of the present embodiment are formed through a cutting process. A cross section of the groove 41, which is taken in a direction that is perpendicular to an elongation direction of the groove 41, has a generally triangular shape (generally V-shape). A depth d1 of the groove 41 is in a range of 0.1 mm to 0.5 mm. An opening width w1 of the groove 41 is determined according to a shape of a machining edge (single-point tool), which is used to form the groove 41 having the desired depth. Therefore, the opening width w1 of the groove 41 corresponds to the depth of the groove 41. Desirably, the opening width w1 of the groove 41 is in the range of 0.1 mm to 0.5 mm like the depth d1 of the groove 41.

Furthermore, as shown in FIG. 4, a solid material 62, which is made of thermoset resin containing iron oxide powder 61 dispersed in the thermoset resin, is held in the inside of the groove 41. The iron oxide powder 61 is the powder of the iron oxide, which is metal oxide. A particle diameter (particle size) of the iron oxide powder 61 is smaller than the groove 41. The iron oxide of the present embodiment is Iron (III) oxide and is expressed by a compositional formula of $Fe_2O_3$. Furthermore, in the present embodiment, epoxy resin is used as the thermoset resin.

Next, a manufacturing method of the solid material 62, which is held in each of the grooves 41, will be described. Although not depicted in the drawings, liquid epoxy resin is prepared, and liquid dispersion, which is formed by dispersing the iron oxide powder into the ethanol alcohol, is prepared. Then, the liquid state epoxy resin and the liquid dispersion are mixed together to form a liquid mixture.

Then, the liquid mixture is applied to the inside of the grooves 41 and is dried. Thereafter, the liquid mixture is heated to solidify the epoxy resin. Then, depending on a need, the surface of the solidified epoxy resin is polished to implement the required surface smoothness. In this way, the solid material 62 of the epoxy resin, in which the iron oxide powder 61 is dispersed, is formed in the inside of the groove 41. Here, with respect to the liquid mixture of the liquid state epoxy resin and the liquid dispersion, when the amount of the iron oxide powder contained in the liquid mixture is excessively reduced, the iron oxide powder supplied to the location between the rotor 10 and the armature 20 is reduced. In contrast, when the amount of the iron oxide powder contained in the liquid mixture is excessively increased, a bonding force provided by the epoxy resin is reduced. Therefore, a ratio of the liquid epoxy resin and the iron oxide powder may be set in view of these points.

Figure 5:
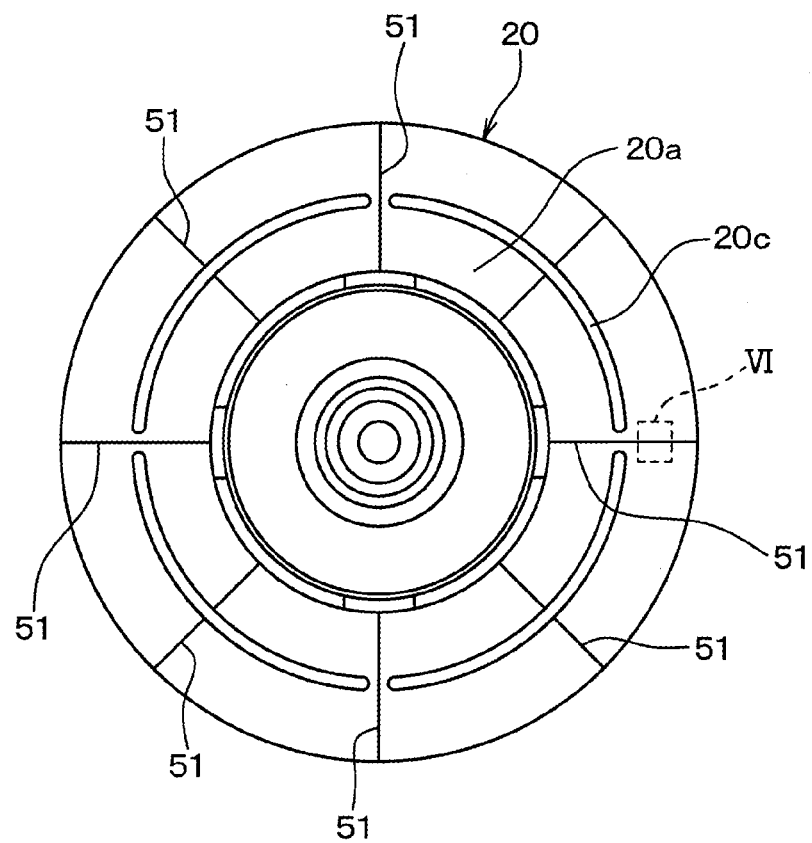
FIG. 5 is a front view of a friction surface of an armature shown in FIG. 1.
Figure 6:
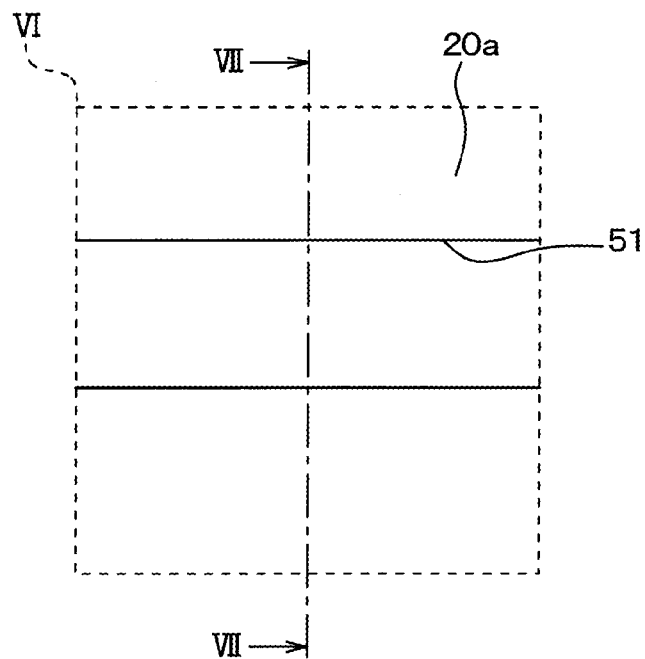
FIG. 6 is an enlarged view of an area VI in FIG. 5.
Figure 7:
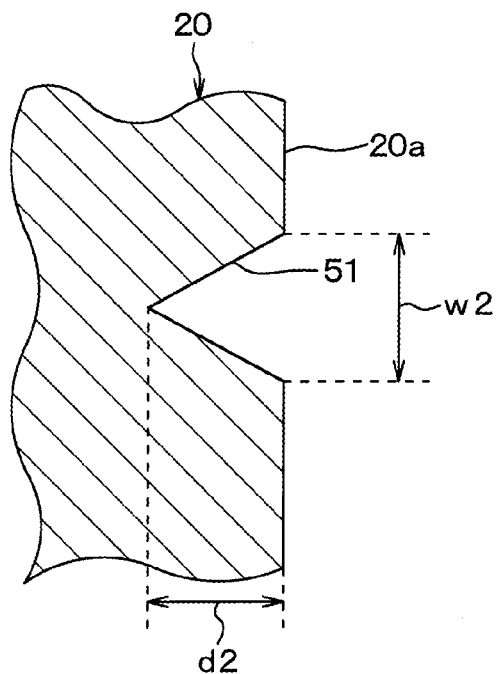
FIG. 7 is a partial cross-sectional view taken along line VII-VII in FIG. 6.

As shown in FIG. 5, a plurality of radial grooves 51 is formed in the friction surface 20a of the armature 20. That is, the radial grooves 51, each of which is elongated in a line form (a straight line form, i.e., a straight line shape) in the corresponding radial direction of the armature 20, are formed in the friction surface 20a. As shown in FIGS. 6 and 7, each groove 51 is a recess that has a bottom, and thereby the groove 51 does not extend through the armature 20. The groove 51 of the present embodiment is formed through a cutting process like in the case of the groove 41 of the rotor 10 discussed above. A cross section of the groove 51 has a generally triangular shape (generally V-shape). A depth d2 of the groove 51 is the same as the depth d1 of the groove 41 of the rotor 10. The grooves 51 are formed in a corresponding area of the friction surface 20a of the armature 20, which does not have the magnetically insulating slits 20c. That is, the grooves 51 are formed in the corresponding area of the friction surface 20a of the armature 20, which forms the magnetic circuit X of FIG. 1.

Next, the operation of the solenoid clutch 1 will be described. When the solenoid coil 35 is energized, the magnetic flux flows in the magnetic circuit X in the order of the stator 30, the rotor 10, the armature 20 and the stator 30, as indicated by a dot dash line in FIG. 1. In this way, the magnetic force is generated between the rotor 10 and the armature 20. Therefore, when the solenoid coil 35 is energized, the armature 20 is attracted to and is coupled with the friction surface 13a of the rotor 10 by the magnetic force generated from the solenoid coil 35. In this way, the rotor 10 and the armature 20 are coupled with each other. Thereby, the rotational drive force is conducted from the engine to the compressor 2.

When the solenoid coil 35 is deenergized, i.e., when the solenoid coil 35 is held in the deenergized state, the magnetic force is not generated. Thereby, the armature 20 is decoupled from the friction surface 13a of the rotor 10 by the resilient force of the rubber 23. Thereby, the rotational drive force is not conducted from the engine to the compressor 2.

Next, advantages of the present disclosure will be described.

(1) When the energization and the deenergization of the solenoid coil 35 are repeated to repeat the coupling and decoupling between the rotor 10 and the armature 20, the wearing of the friction surface 13a of the rotor 10 and the friction surface 20a of the armature 20 occur. At this time, in the friction surface 13a of the rotor 10, besides the rotor 10 itself, the solid material 62 in each groove 41 is worn. Thus, the wear particles of the rotor 10 and the iron oxide powder 61 are supplied to the location between the friction surface 13a of the rotor 10 and the friction surface 20a of the armature 20. Furthermore, in the friction surface 20a of the armature 20, the iron oxide powder 61, which is supplied between the friction surface 13a of the rotor 10 and the friction surface 20a of the armature 20, is accumulated in the inside of the groove 51 or is outputted from the inside of the groove 51. In this way, the iron oxide powder 61 functions as a friction adjusting agent to cause an increase in the friction coefficient.

Furthermore, in the present embodiment, the spiral grooves 41 are formed in the friction surface 13a of the rotor 10, and the radial grooves 51 are formed in the friction surface 20a of the armature 20. Each of the spiral grooves 41 is elongated in the corresponding spiral direction, and each of the grooves 51 is elongated in the corresponding radial direction, so that the spiral grooves 41 and the radial grooves 51 intersect with each other when the grooves 51 of the one friction surface 20a are projected over the other friction surface 13a in the axial direction of the rotational central axis O. As discussed above, the controlling of the elongation directions of the grooves 41, 51 formed in the friction surfaces 13a, 20a contributes to the increase in the friction coefficient. That is, according to the present embodiment, the friction coefficient can be increased through the interaction between the grooves 41, 51, which have the controlled elongation directions, and the iron oxide powder 61, which is present between the friction surface 13a and the friction surface 20a.

Figure 8:
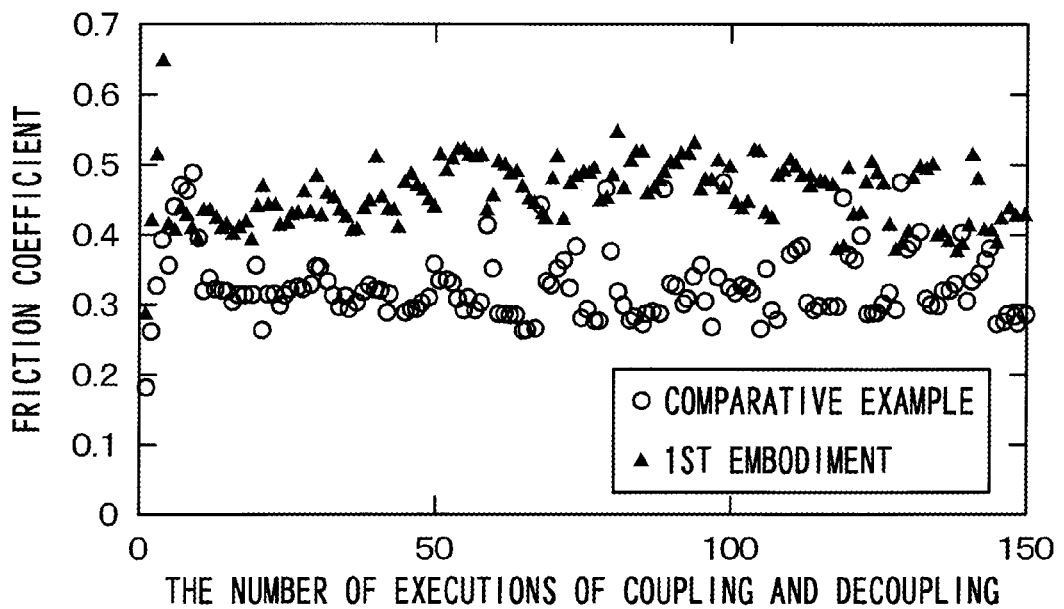
FIG. 8 is a diagram showing a result of measurement of a friction coefficient of a solenoid clutch of the first embodiment and a result of measurement of a friction coefficient of a solenoid clutch of a comparative example.

FIG. 8 shows comparison of the friction coefficients of the solenoid clutch 1 of the present embodiment and friction coefficients of a solenoid clutch of a comparative example. FIG. 8 is a measurement result of the friction coefficient at the time of repeating the coupling and the decoupling (engaging and disengaging) between the rotor 10 and the armature 20 in the rotating state of the rotor 10. In FIG. 8, an axis of ordinates indicates the friction coefficient, and an axis of abscissas indicates the number of executions of the coupling and decoupling (the number of executions of the engagement) between the rotor 10 and the armature 20.

The solenoid clutch 1 of the present embodiment used in the test has the opening width and the depth of the grooves 41, 51 in the range of about 0.3 mm to 0.5 mm. Furthermore, the solenoid clutch of the comparative example differs from the solenoid clutch 1 of the present embodiment with respect to the following points. Specifically, in the solenoid clutch of the comparative example, the grooves 41 and the solid material 62 are not formed in the friction surface 13a of the rotor 10, and the grooves 51 are not formed in the friction surface 20a of the armature 20. Other than these points, the solenoid clutch of the comparative example is similar to the solenoid clutch 1 of the present embodiment. Furthermore, the measurement condition includes a contact load of 200 N, a rotor rotational speed of 900 rpm, a contacting time period (coupling time period) of 0.1 second, a contacting number of 150 times, and the execution of the test in the non-lubricating atmosphere.

As shown in FIG. 8, it has been confirmed that the friction coefficients are higher and are stabilized in the solenoid clutch 1 of the present embodiment in comparison to the solenoid clutch of the comparative example. Furthermore, it is confirmed that the iron oxide powder is accumulated in the grooves 51 of the friction surface 20a of the armature 20 after the execution of coupling and decoupling for 150 times in the test.

(2) In the present embodiment, the iron oxide powder 61 is held in the grooves 41 by the bonding force of the thermoset resin of the solid material 62. Therefore, the iron oxide powder 61 can be more strongly held in the grooves 41 in comparison to a case where the iron oxide powder 61 is solely embedded in the grooves 41. In this way, like in the case of the present embodiment, even when the clutch 1 is used in the drive mechanism of the compressor 2 of the vehicle air conditioning system, the iron oxide powder 61 can be kept supplied between the friction surfaces 13a, 20a. That is, the iron oxide power 61 can be stably interposed between the friction surfaces 13a, 20a. Thus, in the present embodiment, the high friction coefficient state can be maintained.

Second Embodiment

A second embodiment of the present disclosure will be described with reference to FIG. 9. The clutch 1 of the second embodiment is similar to the first embodiment except that the placement of the solid material 62 is changed from that of the first embodiment.

Figure 9:
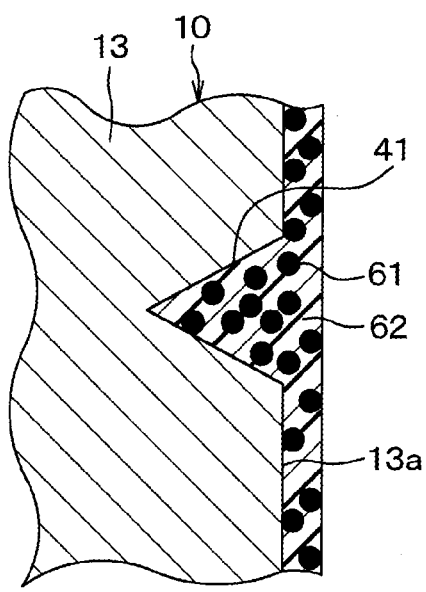
FIG. 9 is an enlarged cross-sectional view of an end surface portion of a rotor according to a second embodiment of the present disclosure.

As shown in FIG. 9, in the present embodiment, the solid material 62, which is made of the epoxy resin containing the iron oxide powder 61 dispersed in the epoxy resin, is formed not only in the grooves 41 but also in the remaining area of the friction surface 13a, which does not have the grooves 41. More specifically, the solid material 62 is formed throughout the remaining area of the friction surface 13a, in which the magnetically insulating slits 13c are not formed.

In the present embodiment, when the rotor 10 and the armature 20 are coupled with each other, the solid material 62 on the friction surface 13a is worn, so that the iron oxide power 61 is supplied between the friction surface 13a of the rotor 10 and the friction surface 20a of the armature 20. Therefore, in the present embodiment, the high friction coefficient state can be achieved from the initial stage of the repeated coupling and decoupling between the rotor 10 and the armature 20.

In the present embodiment, the solid material 62 is formed throughout the remaining area of the friction surface 13a, in which the magnetically insulating slits 13c are not formed. Alternatively, the solid material 62 may be formed only in a portion(s) of the remaining area of the friction surface 13a, in which the magnetically insulating slits 13c are not formed.

Third Embodiment

Figure 10:
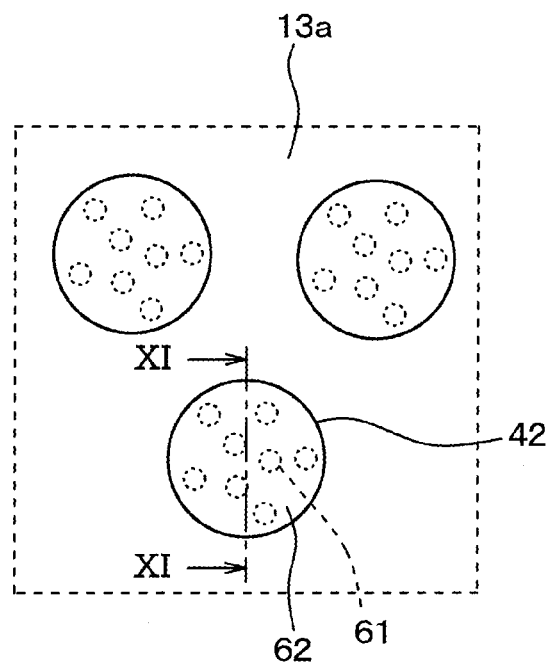
FIG. 10 is an enlarged view of a friction surface of a rotor according to a third embodiment of the present disclosure, showing an area of the rotor, which corresponds to the area of the rotor of FIG. 3.
Figure 11:
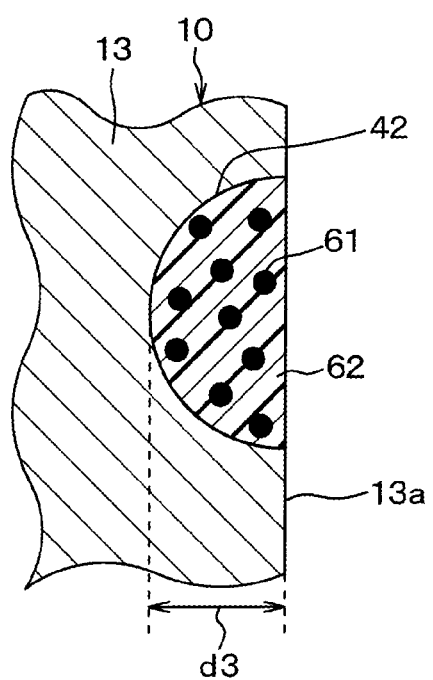
FIG. 11 is a partial cross-sectional view taken along line XI-XI in FIG. 10.

A third embodiment of the present disclosure will be described with reference to FIGS. 10 and 11. In the third embodiment, a plurality of recesses 42, each of which is configured into a dot form, is formed in the friction surface 13a of the rotor 10 in place of the spiral grooves 41. Although not depicted in FIGS. 10 and 11, the friction surface 20a of the armature 20 is planar (smooth). The rest of the structure of the clutch 1 of the third embodiment is the same as that of the first embodiment.

The recesses 42, each of which is configured into the dot form and has a bottom, are formed by abrasive blasting that is the operation of forcibly propelling a stream of abrasive grains against a surface under high pressure to roughen the surface (thereby forming dotted surface). The abrasive grains, each of which is configured into a generally spherical form, are used in this embodiment, so that each recess 42 in the dot form has a generally semispherical concave surface, as shown in FIGS. 10 and 11. Thereby, an opening of the recess 42 in the friction surface 13a is a generally circular form, and a cross section of the recess 42, which is taken along a plane perpendicular to the friction surface 13a, has a generally arcuate shape. A depth d3 of the recess 42 is the same as the depth dl of the spiral groove 41 of the first embodiment. The recess 42 in the dot form can be any other appropriate shape as long as the shape (e.g., a polygonal shape, such as a rectangular shape) of the opening of the recess 42 in the friction surface 13a has an isotropic opening width.

The solid material 62, which is made of the thermoset resin that contains the iron oxide powder 61 dispersed in the thermoset resin, is formed in the inside of the recess 42 in the dot form. Even in the present embodiment, the advantages, which are similar to those of the first embodiment, can be achieved.

In the present embodiment, the friction surface 20a of the armature 20 is the planar surface (planar smooth surface). Alternatively, similar to the friction surface 13a of the rotor 10, a plurality of recesses, each of which is configured into a dot form, may be formed in the friction surface 20a of the armature 20, if desired.

The present disclosure is not limited to the above embodiments, and the above embodiments may be modified in various ways within the scope of the present disclosure. For instance, the above embodiments may be modified as follows.

(1) In the first and second embodiments, the grooves 51 are formed in the friction surface 20a of the armature 20. Alternatively, the grooves 51 may be eliminated from the friction surface 20a of the armature 20. Even in such a case, the iron oxide powder 61 can be supplied between the friction surface 13a of the rotor 10 and the friction surface 20a of the armature 20 to implement the high friction coefficient state by forming the solid material 62 in the inside of the grooves 41 of the friction surface 13a of the rotor 10.

(2) In the first to third embodiments, the solid material 62, which is made of the thermoset resin that contains the iron oxide powder 61 dispersed in the thermoset resin, is formed only in the friction surface 13a of the rotor 10. Alternatively, the solid material 62 may be formed only in the friction surface 20a of the armature 20. Further alternatively, the solid material 62 may be formed in both of the friction surface 13a of the rotor 10 and the friction surface 20a of the armature 20. In the case where the solid material 62 is formed in both of the friction surface 13a and the friction surface 20a, the iron oxide powder 61 is supplied from both of the friction surface 13a and the friction surface 20a. Therefore, the iron oxide powder 61 is stably interposed between the friction surface 13a and the friction surface 20a to maintain the high friction coefficient state.

(3) In the first and second embodiments, the grooves 41, 51 are formed through the cutting process. Alternatively, the grooves 41, 51 may be formed through any other suitable machining process. Furthermore, the shape of the cross section of the grooves 41, 51 may be any other suitable shape, which is other than the triangular shape (V-shape).

(4) In the first and second embodiments, the spiral grooves 41, each of which is elongated in the spiral direction, are formed in the friction surface 13a of the rotor 10, and the radial grooves 51, each of which is elongated in the radial direction, are formed in the friction surface 20a of the armature 20. However, the elongation directions of the grooves 41, 51 are not limited to the spiral direction and the radial direction. That is, as long as the grooves 41 intersect with the grooves 51 when the grooves 51 of the one friction surface 20a is projected over the other friction surface 13a in the axial direction of the rotational central axis O, the elongation direction of the grooves 41 and the elongation direction of the grooves 51 may be any other suitable directions, respectively.

(5) In each of the above embodiments, the powder 61 of the iron oxide, which is expressed by the compositional formula of $Fe_2O_3$, is used. Alternatively, powder of iron oxide, which is expressed by a compositional formula of $Fe_3O_4$, may be used as the iron oxide powder contained in the solid material 62. Furthermore, in place of the iron oxide powder 61, powder of any other suitable metal oxide may be used as long as the powder of the other suitable metal oxide can increase the friction coefficient when the powder of the other suitable metal oxide is interposed between the friction surfaces 13a, 20a. For instance, powder of, for example, potassium titanate, silica or alumina may be used as the powder of the metal oxide contained in the solid material 62.

(6) In each of the above embodiments, the epoxy resin is used as the thermoset resin. Alternatively, another type of thermoset resin, such as phenol resin, may be used in place of the epoxy resin.

(7) It is desirable that the magnetic material of the rotor 10 and the armature 20 is mild steel or low carbon steel. The mild steel may be, for example, Steel Plate Hot Commercial (SPHC), or Steel Plate Cold Commercial (SPCC), and the low carbon steel may be, for example, S12C.

(8) In each of the above embodiments, the principle of the present disclosure is applied to the solenoid clutch, in which the armature 20 is magnetically attracted to and is coupled with the rotor 10 by the magnetic force generated by the solenoid coil. Alternatively, the principle of the present disclosure may be applied to a clutch, which uses a permanent magnet(s). In the clutch, which uses the permanent magnet(s), the magnetic force of the permanent magnet(s) is used to maintain the coupled state of the rotor and the armature, and a solenoid coil is used to apply a magnetic flux, which flows in a direction that is the same as or opposite from a direction of a magnetic flux generated by the permanent magnet(s) to switch between coupling and decoupling between the rotor and the armature.

(9) In each of the above embodiments, any one or more of the components of the embodiment may be appropriately combined with any one or more of the components of any one or more of the embodiments unless such a combination is obviously impossible. For instance, the second embodiment and the third embodiment may be combined. Specifically, in the friction surface 13a of the rotor 10 of the third embodiment, the solid material 62 may be formed not only in each recess 42 in the dot form but also in the remaining area of the friction surface 13a, in which the recesses 42 are not formed.

Furthermore, in each of the above embodiments, some components discussed above may be eliminated unless the components are expressly indicated as indispensable components or are obviously considered as indispensable components in view of the principle of the present disclosure. Furthermore, in each of the above embodiments, in the case where the number of the component(s), the value, the amount, the range, or the like is specified, the present disclosure is not limited to the number of the component(s), the value, the amount, or the like specified in the embodiment unless the number of the component(s), the value, the amount, or the like is indicated as indispensable or is obviously indispensable in view of the principle of the present disclosure. Furthermore, in each of the above embodiments, in the case where the material of the component(s), the shape of the component(s), and/or the positional relationship of the component(s) are specified, the present disclosure is not limited to the material of the component(s), the shape of the component(s), and/or the positional relationship of the component(s) unless the embodiment specifically states that the material of the component(s), the shape of the component(s), and/or the positional relationship of the component(s) is necessary, or the embodiment states that the present disclosure is limited in principle to the material of the component(s), the shape of the component(s), and/or the positional relationship of the component(s) discussed above.

What is claimed is:

1. A clutch comprising:
  a rotor that is made of a magnetic material, wherein the rotor is rotated when the rotor receives a rotational drive force from drive: source; and
  an armature that is made of a magnetic material, wherein the armature receives the rotational drive force from the rotor when the armature is magnetically attracted to and is coupled with the rotor by a magnetic force, wherein:
  the rotor and the armature include contact surfaces, respectively, which contact with each other when the armature is magnetically attracted to and is coupled with the rotor;
  a groove which has a bottom, is formed in each of the contact surface of the rotor and the contact surface of the armature, and a solid material, which is made of thermoset resin that contains powder of metal oxide or metal dispersed in thermoset resin, is formed in an inside of the groove in at least one of the contact surface of the rotor and the contact surface of the armature; and
  the groove of the contact surface of the rotor and the groove of the contact surface of the armature intersect with each other by the groove of one of the contact surface of the rotor and the contact surface of the armature e over the more of another one of the contact surface of the rotor and the contact surface of the armature.

2. The clutch according to claim 1, wherein a depth of each of the groove of the contact surface of the rotor and the groove of the contact surface of the armature is in a range of 0.1 mm to 0.5 mm.

3. The clutch according to claim 1, wherein the solid material is formed in the inside of the groove and a remaining area, in which the move is not formed, in the at least one of the contact surface of the rotor and the contact surface of the armature.

4. The clutch according to claim 1, wherein one of the groove of the contact surface of the rotor and the groove of the contact surface of the armature is a spiral groove, and another one of the groove of the contact surface of the rotor and the groove of the contact surface of the armature is a radial groove.

5. A clutch comprising:
  a rotor containing a magnetic material and configured to rotate when receiving a rotational drive force from a drive source; and
  an armature containing a magnetic material and receiving the rotational drive force from the rotor when the armature is magnetically attracted to and is coupled with the rotor by a magnetic force, wherein:
  the rotor and the armature each have a contact surface, the contact surface of the rotor being in contact with the contact surface of the armature when the armature is magnetically attracted to and is coupled with the rotor,
  each of the contact surfaces of the ro or and the armature has a groove, each groove comprising a recess with a bottom, at least one groove of grooves in the contact surfaces of the rotor and the armature contains a solid material, the solid material comprising a thermoset resin containing a powder of metal or metal oxide dispersed in the thermoset resin, and the grooves of the contact surfaces of the rotor and the armature have a length sufficient to cross and intersect with each other when the contact surfaces of the rotor and the armature contact each other by the armature being magnetically attracted to and coupled with the rotor.

6. The clutch according to claim 5, wherein each groove has a depth in a range of 0.1 mm to 0.5 mm.

7. The clutch according to claim 5, wherein the one groove of grooves in the contact surfaces of the rotor and the armature contains the solid material on an inside of the groove and in an area outside the groove.

8. The clutch according to claim 5, wherein one of the grooves of the contact surfaces of the rotor and the armature is a spiral groove, and another of the grooves of the contact surfaces of the rotor and the armature is a radial groove.

* * * * *